United States Patent
Raedsch

(10) Patent No.: US 11,935,253 B2
(45) Date of Patent: Mar. 19, 2024

(54) METHOD AND SYSTEM FOR SPLITTING VISUAL SENSOR DATA

(71) Applicant: dSPACE digital signal processing and control engineering GmbH, Paderborn (DE)

(72) Inventor: Tim Raedsch, Karlsruhe (DE)

(73) Assignee: DSPACE GMBH, Paderborn (DE)

( * ) Notice: Subject to any disclaimer, the term of this patent is extended or adjusted under 35 U.S.C. 154(b) by 380 days.

(21) Appl. No.: 17/462,037

(22) Filed: Aug. 31, 2021

(65) Prior Publication Data

US 2023/0067783 A1 Mar. 2, 2023

(51) Int. Cl.
*G06T 7/38* (2017.01)
*G06T 7/70* (2017.01)
*G06V 20/40* (2022.01)

(52) U.S. Cl.
CPC ............... *G06T 7/38* (2017.01); *G06T 7/70* (2017.01); *G06V 20/49* (2022.01); *G06T 2207/10016* (2013.01); *G06T 2207/20084* (2013.01); *G06T 2207/30242* (2013.01); *G06V 2201/07* (2022.01)

(58) Field of Classification Search
CPC ... G06T 7/38; G06T 7/70; G06T 2207/10016; G06T 2207/20084; G06T 2207/30242; G06V 20/49; G06V 2201/07; G06V 10/82
See application file for complete search history.

(56) References Cited

U.S. PATENT DOCUMENTS

| | | | |
|---|---|---|---|
| 9,607,224 B2 | 3/2017 | Tsai et al. | |
| 10,790,056 B1* | 9/2020 | Accomazzi | H04L 67/1095 |
| 2006/0215759 A1* | 9/2006 | Mori | H04N 5/147 348/700 |
| 2017/0127095 A1* | 5/2017 | Park | H04N 21/23106 |
| 2017/0182406 A1* | 6/2017 | Castiglia | A63F 13/213 |
| 2020/0226386 A1* | 7/2020 | Chuang | G06V 20/46 |
| 2021/0303156 A1* | 9/2021 | Kachare | G06F 3/0673 |

(Continued)

OTHER PUBLICATIONS

Vitani et al., ("On the Use of Optical Flow for Scene Change Detection and Description", Springer, May 25, 2013) (Year: 2013).*

(Continued)

*Primary Examiner* — Amara Abdi
(74) *Attorney, Agent, or Firm* — LEYDIG, VOIT & MAYER, LTD.

(57) ABSTRACT

A method for automatically splitting visual sensor data comprising consecutive images, the method being executed by at least one processor of a host computer, the method comprising: a) assigning a scene number to each image, wherein a scene comprises a plurality of images taken in a single environment, wherein assigning a scene number to each image is performed based on a comparison between consecutive images; b) determining an accumulated effort for the images in each scene, wherein the accumulated effort is determined based on the number of objects in the images of the scene, wherein the number of objects is determined using one or more neural networks for object detection; and c) creating packages of images, wherein the images with the same scene number are assigned to the same package unless the accumulated effort of the images in the package surpasses a package threshold.

11 Claims, 4 Drawing Sheets

(56) References Cited

U.S. PATENT DOCUMENTS

2022/0371622 A1* 11/2022 Malla ..................... G06N 3/09

OTHER PUBLICATIONS

Wei Liu, et al., "SSD: Single Shot MultiBox Detector", arXiv: 1512.02325, Dec. 29, 2016, pp. 1-17, version 5, Cornell University, Ithaca, USA.

Joseph Redmon, et al., "YOLOv3: An Incremental Improvement", arXiv: 1804.02767, Apr. 8, 2018, pp. 1-6, version 1, Cornell University, Ithaca, USA.

Shaoqing Ren, et al., "Faster R-CNN: Towards Real-Time Object Detection with Region Proposal Networks", arXiv: 1506.01497, Jan. 6, 2016, version 3, Cornell University, Ithaca, USA.

Navid Nourani-Vatani, et al., "On the Use of Optical Flow for Scene Change Detection and Description", Journal of Intelligent and Robotic Systems, May 25, 2013, vol. 74, pp. 817-846, Springer, Berlin, Germany.

* cited by examiner

METHOD AND SYSTEM FOR SPLITTING VISUAL SENSOR DATA

FIELD

The present invention relates to methods and computer systems for automatically splitting visual sensor data into batches of images, such as frames from a video.

BACKGROUND

The capabilities of machine learning algorithms have considerably increased in recent years, thus making autonomous driving of vehicles possible. Further advances are limited by the need for enormous quantities of sufficiently diverse training data for the neural networks. The preparation of training data generally requires recording many different driving scenarios by a vehicle equipped with a set of sensors, such as one or more cameras, a lidar sensor and/or a radar sensor. Before using these recorded scenarios as training data, they need to be annotated.

This is often performed by annotation providers who receive the recorded data and split them up in work packages for a plurality of human workers, also called labelers. The exact annotations needed (e.g. the classes of objects to distinguish) depend on each project and are described in a detailed labeling specification. Generally, the data often comprises a mix of different clips, single frames or short sequences of frames. The customer delivers the data as is at the annotation provider and expects high quality annotations according to his specifications in a short timeframe.

A common approach is to split the received data comprising a plurality of frames into fixed sized chunks of frames, so that a work package may e.g. consist of 30 frames. This approach has several implications:

- Work packages have different turnover durations (e.g. 20 frames of a crowded highway vs 20 frames of an empty street);
- Different work packages can have different labelers and therefore different interpretations, even if the frames show the same scene;
- Speeding up labeling by employing more labelers increases the throughput but lowers the overall quality of the annotations at the same time (due to a larger number of interpretations);
- Maintaining a high labeling quality requires time-intensive quality checks (in particular at the borders between work packages).

Thus, improved methods for automatically splitting batches of images are needed; it would be particularly desirable to generate work packages that allow higher throughput and a more evenly distributed quality of annotations.

SUMMARY

In an exemplary embodiment, the present invention provides a method for automatically splitting visual sensor data comprising consecutive images. The method is executed by at least one processor of a host computer. The method includes: a) assigning a scene number to each image, wherein a scene comprises a plurality of images taken in a single environment, wherein assigning a scene number to each image is performed based on a comparison between consecutive images, the comparison being based on one or more of: optical flow; Global Positioning System (GPS) coordinates; Inertial Measurement Unit (IMU) acceleration data; or file properties; b) determining an accumulated effort for the images in each scene, wherein the accumulated effort is determined based on the number of objects in the images of the scene, wherein the number of objects is determined using one or more neural networks for object detection; and c) creating packages of images, wherein the images with the same scene number are assigned to the same package unless the accumulated effort of the images in the package surpasses a package threshold.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

Figure 1:
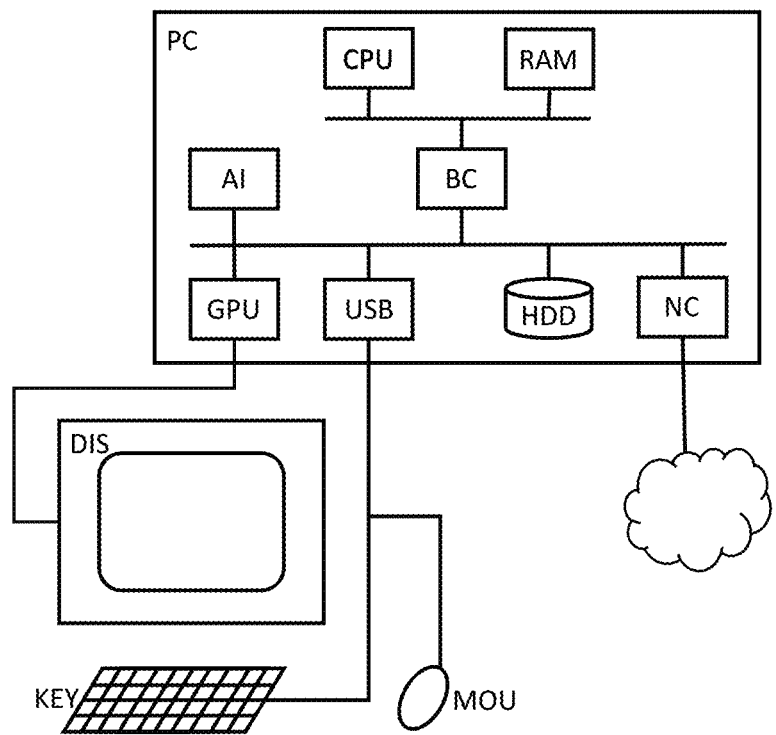
FIG. 1 is an exemplary diagram of a computer system.

In the figures, like elements are designated by the same letters. While the invention is susceptible to various modifications and alternative forms, specific embodiments are shown by way of example in the drawings and will herein be described in detail. It should be understood however, that drawings and detailed description thereto are not intended to limit the invention to the particular form disclosed. On the contrary, the invention is to cover all modifications, equivalents and alternative following within the spirit and scope of the present invention as defined by the appended claims.

DETAILED DESCRIPTION

Exemplary embodiments of the present invention provide methods and computer systems for automatically splitting visual sensor data comprising consecutive images, in particular video frames.

In a first aspect of the invention, a computer-implemented method for automatically splitting visual sensor data comprising consecutive images, in particular video frames, is provided. The method comprises:

assigning a scene number to each image, wherein a scene comprises a plurality of images taken in a single environment, wherein assigning a scene number to each image is performed based on a comparison between consecutive images, in particular two consecutive images, the comparison being based on one or more of:

Optical flow;
Global Positioning System (GPS) coordinates;
Inertial Measurement Unit (IMU) acceleration data; or
File properties, such as file name or timestamp;

determining an accumulated effort for the images in each scene, wherein the accumulated effort is determined based on the number of objects in the images of the scene, wherein the number of objects is determined using one or more neural networks for object detection; and creating packages of images, wherein the images with the same scene number are assigned to the same package unless the accumulated effort of the images in the package surpasses a package threshold.

The host computer may be realized as a single standard computer comprising a processor, such as a general-purpose microprocessor, a display device and an input device. Alternatively, the host computer system may comprise one or more servers comprising a plurality of processing elements, the servers being connected to a client comprising a display device and an input device via a network. Thus, the labeling software may be executed partially or completely on a remote server, such as in a cloud computing setup, so that only a graphical user interface needs to be executed locally.

An accumulated effort can be estimated using one or more pretrained neural networks. Results from different neural networks can be combined for a more accurate prediction of the labeling effort.

As the packages contain images from one clip, it is easier for the labeler to adapt to the scene and interpretation differences between labelers are minimized. Advantageously, exemplary embodiments of the inventive method allows for both increased labeling speed and more consistent labeling quality.

In an embodiment, two consecutive images are assigned the same scene number, when one or more of the following conditions are met:
- The absolute change in the optical flow is lower than a predefined change threshold (Optical flow is the pattern of apparent motion of image objects between two consecutive frames that is caused by the movement of an object or of the camera. An accumulated or integrated optical flow may be calculated for each image and the compared to the change threshold.);
- The distance between GPS coordinates is lower than a predefined location threshold (If the GPS coordinates of two subsequent frames vary by a large distance, they cannot have been taken as part of the same clip. The location threshold may depend on the GPS accuracy and the maximum obtainable speed (e.g. due to a speed limit).);
- The difference between acceleration data is lower than a predefined movement threshold (If the acceleration corresponding to a first frame differs considerably from the acceleration corresponding to a second frame. The movement threshold may depend on the vehicle.); or
- The two consecutive images are frames in the same video file or two image files whose file name starts with the same characters and/or whose timestamps do not differ by more than a maximum duration (As file properties such as a file name or a timestamp reflect the creation of an image, they may be used to determine whether consecutive images form part of the same clip. For instance, the name of a folder may indicate a creation time, but may also be misleading and thus most file properties are preferably used only as a secondary criterion. By contrast, if the timestamps have sufficient accuracy, they may allow for reliable determination if consecutive images belong to the same clip.).

To split the delivered images into packages that only consist of one continuous clip, several of the image comparison methods can be combined. Which criteria to use can be determined based on the availability and accuracy of the data associated with each image. Optical flow results from an analysis of subsequent images and thus is always available but may be computationally expensive. Thus, it may be used as a fallback criterion when only insufficient and/or inaccurate other associated data are available.

In an embodiment, only those objects are counted whose confidence level according to the neural network for object detection is higher than a certainty threshold. By predefining a suitable certainty threshold for the used neural networks, false positives can be minimized. As the detections are only used for determining the effort, the labeling result is not deteriorated in case of a false positive.

In an embodiment, scenes are split if the accumulated effort of the images in the scene surpasses the package threshold, and wherein the split is applied between images with a local minimum of objects. By choosing a local minimum in the number of objects for splitting work packages, the effort for quality control of the borders is minimized. Thus, the labeling can be performed simultaneously by a larger number of labelers without proportional increase in the effort for quality control. The local minimum may be determined by comparing the number of objects in several consecutive images (e.g. four) and choosing two adjacent images with the lowest number of objects as work package borders. Alternatively, an average number of objects can be determined over a sliding window (of e.g. three images) to remove outliers. When splitting a scene, the different parts are preferably assigned subsequent scene numbers.

In an embodiment, the creation of a package of images comprises adding images with a subsequent scene number to the package, when the accumulated effort for images already in the package is lower than the package threshold. Thus, the work packages are created more uniformly for a better parallelization of the labeling. Different strategies for splitting and combining may be used; in a preferred strategy, clips are always first split in multiple scenes and then put back together.

In an embodiment, the accumulated effort for images in the next scene is compared to the difference between the package threshold and the accumulated effort for images in the package, and images in the next but one scene are added to the current package when the difference is smaller than the accumulated effort for the next scene, wherein a further package is created for the images in the next scene.

In an embodiment, the visual sensor data comprises not only consecutive image data from a first camera, but also consecutive data from a further visual sensor, such as a second camera or a lidar sensor, wherein the image data from the first camera and the second visual sensor are temporally correlated, and wherein the consecutive data from the further visual sensor is split into packages based on the accumulated effort of the images from the first camera. By using temporal correlation between the data from different sensors, it is sufficient to process data from one camera for splitting all data into work packages. Which camera to choose as first camera may depend on the situation; in most cases the front camera may be most relevant, but when maneuvering in a parking space, the rear-looking camera may be more suitable. Work packages may be created independently for each sensor; alternatively, all sensors depicting one scene may be compiled into a single work package.

In an embodiment, objects of different categories are weighted differently when determining the accumulated effort, and wherein packages are split according to the weighted accumulated effort. In particular, only objects of one class may be counted, or objects of one class may be weighted n times higher compared to objects of one or more other classes (where n is preferably a natural number). The work packages may be assigned a labeler based on a predominant presence of a particular class of objects, in order to get a more consistent interpretation of these objects.

In an embodiment, the accumulated effort is modified based on one or more additional criteria, such as a time of day or a weather condition. If the image or clip was taken at night, or during rain or fog, determining the classification may become harder and thus more time consuming for the labeler and/or quality control. This can be accounted for by multiplying the object number by a weighing factor associated with the situation/additional criterion. Whether a specific weather condition is on hand, can be determined by a car sensor (such as rain sensor) if it was present and the sensor data have been stored). Alternatively or additionally, a dedicated neural network may be trained for recognition of day or night/heavy rain/impaired vision/heavy snow and then used for determining the presence of the respective additional criterion.

In a second aspect of the invention, a computer-implemented method for labeling video data is provided, the method comprising:
a) Creating packages of images using an exemplary embodiment of the inventive method
b) Assigning each package to a worker for labeling
c) Receiving the labeled packages
d) Determining a quality norm for each label, wherein the confidence of a neural network may be used as quality norm,
e) Checking the correctness for each label that has a quality norm below a predefined quality threshold
f) Compiling the image data in one file.

Advantageously, exemplary embodiments of the inventive method allows for speeding up the annotation by automatically choosing suitable batches of images as work packages. The increased labeling speed results from a reduction in the effort for fixing borders between work packages and a more uniform choice of frames to label. This also leads to a higher labeling quality as less occasions for interpretation differences arise due to a lower number of overlapping objects.

One aspect of the invention also concerns a non-transitory computer-readable medium containing instructions that, when executed by a microprocessor of a computer system, cause the computer system to carry out exemplary embodiments of the inventive method as described above or in the appended claims.

In a further aspect of the invention, a computer system is provided which comprises a host computer that comprises a processor, a random-access memory, a display, a human input device, and a nonvolatile memory, in particular a hard disk or a solid-state disk. The nonvolatile memory comprises instructions that, when executed by the processor, cause the computer system to carry out exemplary embodiments of the inventive method.

The processor may be a general-purpose microprocessor that is customary used as the central processing unit of a personal computer or it may comprise one or a plurality of processing elements adapted for carrying out specific calculations, such as a graphics-processing unit. In alternative embodiments of the invention, the processor may be replaced or complemented by a programmable logic device, such as a field-programmable gate array, which is configured to provide a defined set of operations and/or may comprise an IP core microprocessor.

FIG. 1 illustrates an exemplary embodiment of a computer system.

The shown embodiment comprises a host computer PC with a display DIS and human interface devices such as a keyboard KEY and a mouse MOU; further, an external server may be connected via a network, as indicated by a cloud symbol.

The host computer PC comprises at least one processor CPU with one or multiple cores, a random-access memory RAM and a number of devices connected to a local bus (such as PCI Express), which exchanges data with the CPU via a bus controller BC. The devices comprise e.g. a graphics-processing unit GPU for driving the display, a controller USB for attaching peripherals, a non-volatile memory HDD such as a hard disk or a solid-state disk, and a network interface NC. Additionally, the host computer may comprise a dedicated accelerator AI for neural networks. The accelerator may be implemented as a programmable logic device such as a field-programmable gate array, as a graphics processing unit adapted for general calculations, or as an application-specific integrated circuit. Preferably, the non-volatile memory comprises instructions that, when executed by one or more cores of the processor CPU, cause the computer system to carry out a method according to an exemplary embodiment of the present disclosure.

In alternative embodiments, indicated as a cloud in the figure, the host computer may comprise one or more servers comprising one or more processing elements, the servers being connected to a client comprising a display device and an input device via a network. Thus, the labeling environment may be executed partially or completely on a remote server, such as in a cloud computing setup. A personal computer may be used as a client comprising a display device and an input device via a network. Alternatively, a graphical user interface of the technical computing environment may be displayed on a portable computing device, in particular a portable computing device with a touch screen interface.

Figure 2:
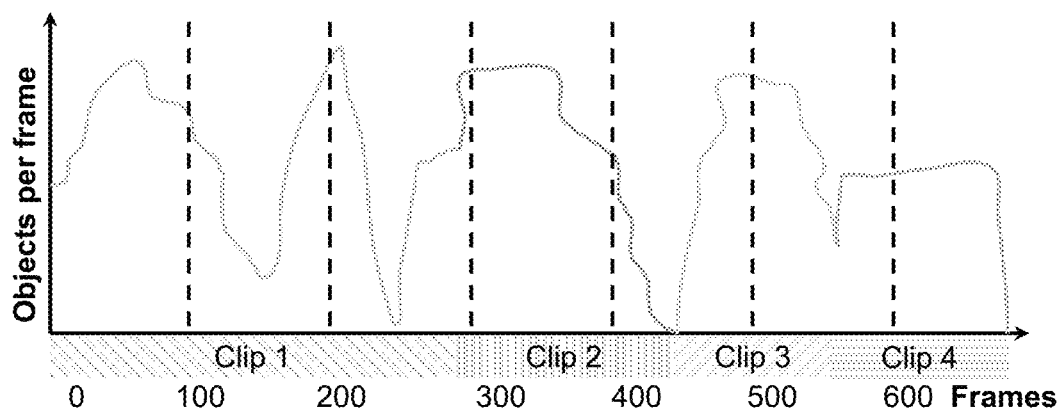
FIG. 2 is a schematic diagram of an exemplary package of video frames.

FIG. 2 displays a schematic diagram of an exemplary package of video frames.

The data to be labeled may be in the form of a folder or an archive file comprising a plurality of video clips and/or images. As indicated by blocks at the bottom of the diagram, the exemplary package comprises four video clips; clip 1 is marked by a pattern of diagonal lines, clip 2 is marked by a pattern vertical lines, clip 3 is marked by a pattern of diagonal lines at a right angle to those of clip 1, and clip 4 is marked by a pattern of horizontal lines. The diagram shows a graph of the number of objects per frame vs. frame number. The number of objects can vary considerably during a clip and will in many cases change abruptly between different clips.

Initially, only the file size of the folder or archive file may be known. A common method for dividing the data would be to split it into chunks of a fixed number of frames/images, as indicated by the dotted vertical lines. The effort needed to label the resulting work packages may vary considerably: For instance, the first part of clip 1 comprises more objects per frame than the second part. Some of the work packages contain parts of two different clips, so that the labeler has to adapt to a completely different scenario, further adding to the effort needed. In addition to the effort for labeling each frame, measures for ensuring a good labeling quality need to be taken: For instance, in the case of two work packages comprising consecutive parts of one clip, the number of boxes needs to be consistent. Usually, this involves human labelers checking adjacent frames.

By splitting the data in work packages according to exemplary embodiments of the inventive method, the total effort for labeling the visual sensor data can be reduced considerably.

Figure 3:
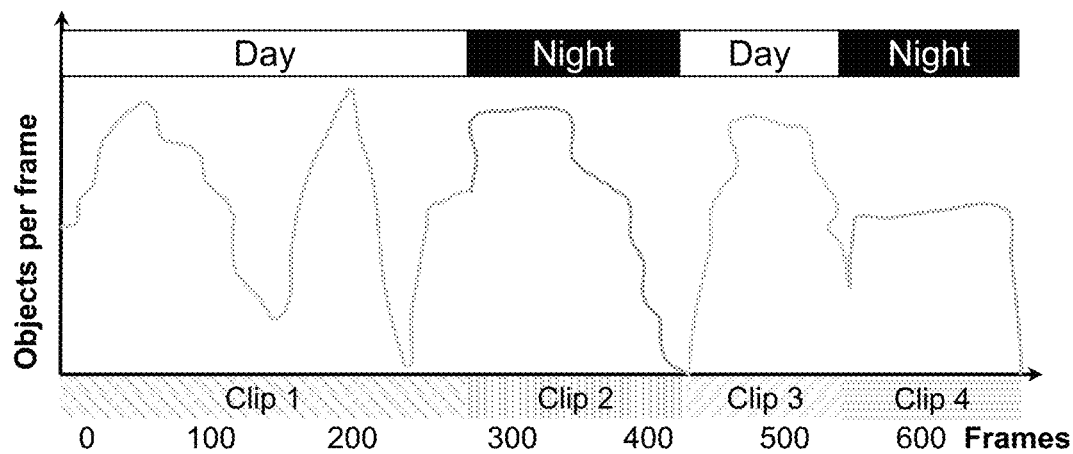
FIG. 3 is a schematic diagram of an exemplary package of video frames with additional daytime indication.

FIG. 3 illustrates a schematic diagram of an exemplary package of video frames with additional daytime indication.

As the time needed for labeling mainly depends on the number of objects to be labeled, the number of objects can be used to measure the effort. To determine the accumulated effort for a clip, the number of objects is determined for each frame of the clip.

Different networks can be used for counting the number of objects:

YOLOv3, described in J. Redmon, A. Farhadi: "YOLOv3: An Incremental Improvement", arXiv: 1804.02767.

Faster R-CNN, described in S. Ren et al.: "Faster R-CNN: Towards Real-Time Object Detection with Region Proposal Networks", arXiv:1506.01497.

SSD, described in W. Liu et al.: "SSD: Single Shot MultiBox Detector", arXiv: 1512.02325.

As only the relative effort estimation is needed for splitting the images, other neural network architectures can be used for future packages, as long as the same configuration is used for all clips in the current package.

The effort estimation can be based on the detected objects from a single neural network, or the detection results from multiple networks can be combined. The combination can be performed in different ways: The results of the neural networks can be averaged, or the maximum value of the different neural networks for the current frame can be chosen. When calculating the average, the results of the different neural networks can be weighted differently (e.g. higher factor for a neural network known to be more reliable). In an embodiment, the results from different neural networks can be fused in a further neural network trained for optimal weighting. This further network can preferably be trained to most closely reproduce known correct numbers of objects based on a publicly available data set as ground truth.

The neural networks can be used as is, i.e. pretrained, or an initial training can be performed with a limited number of frames. Alternatively, the neural networks can be trained based on the labeling results of the current package for use in a subsequent project.

Preferably, the number of objects per frame and the class of the objects are saved for each frame.

The effort estimation can also take the class of an object into account: For instance, the number of pedestrians detected in a frame may be multiplied by a fixed weight, e.g. an integer such as two, to account for the possible changes in their appearance. In contrast, a truck may be weighed less at is easier to discern and hardly changes appearance.

The number of objects per frame as detected by a neural network is shown in FIG. 3 above the blocks indicating the different clips (as in FIG. 2).

Additional characteristics such as the time of day may influence the effort for labeling the image. For instance, the lower contrast at night makes objects harder to discern and thus increases the labeling effort. This can be accounted for by multiplying the number of detected objects by a predefined factor such as 1.5.

A dedicated neural network may be used for classifying each frame in day or night-time. Other characteristics may also be taken into account, such as weather, with rain, snow or fog also increasing the labeling effort.

In FIG. 3, a determined daytime is indicated at the top of the diagram; clip 1 and clip 3 were taken at daytime, whereas clip 2 and clip 4 were taken at night and may thus be harder to label. Additionally or alternatively, the labeler may be chosen according to a determined daytime, so that some labelers may specialize in labeling images taken at night.

Figure 4:
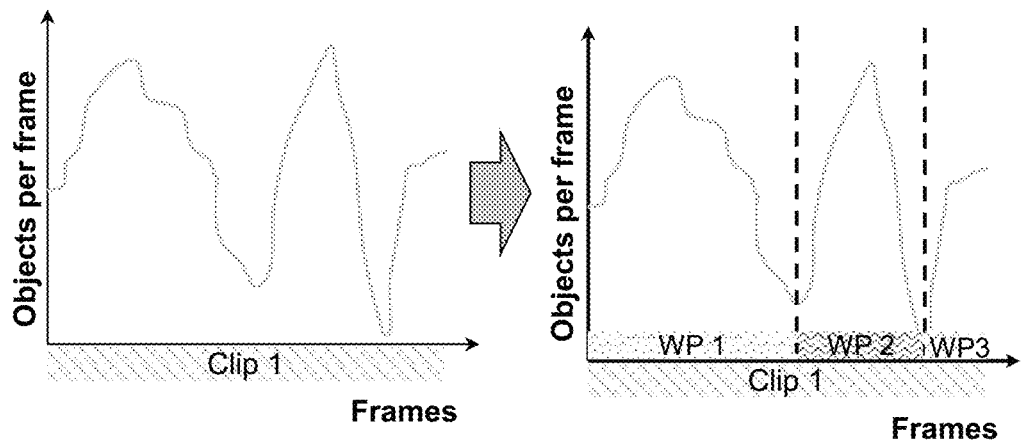
FIG. 4 is an exemplary diagram of splitting one clip into multiple packages.

FIG. 4 displays an exemplary diagram of splitting one clip into multiple packages.

On the left side, the diagram visualizes the number of objects per frame for each frame of the first video clip. To minimize the effort for ensuring the same boxes and labels in the border frames, different work packages are split at local minima in the number of objects. In an embodiment of the invention two adjacent frames that have a lower number of objects than their respective previous or subsequent frame are chosen. This comparison can be made for a plurality of nearest neighbors. Alternatively, an average number of objects can be determined for a sliding window of a fixed number of frames.

On the right, the diagram for the first clip is shown with cut positions indicated by vertical dotted lines. The first clip has been divided into three work packages, WP1, WP2 and WP3. Advantageously, the objects present at the borders of the work packages can be fixed in a short time, as only few objects need to be considered. Different labelers can work on the work packages simultaneously with little impact on labeling consistency. Further, one work package only comprises frames from one clip, so no adaption for different environments is necessary.

In an embodiment, different work packages determined based solely on local minima can be combined to result in a work package that most closely corresponds to a given effort. This effort can easily be estimated based on the number of objects in the frames. Thus, consecutive batches of images can be combined to work packages corresponding to a predefined effort threshold. For the shown example, work packages WP2 and WP3 could be combined, so that the clip is divided in two final work packages with roughly the same labeling effort. Having one labeler work on a larger package showing the same scene minimizes the required adaptation and thus increases the efficiency.

Figure 6:
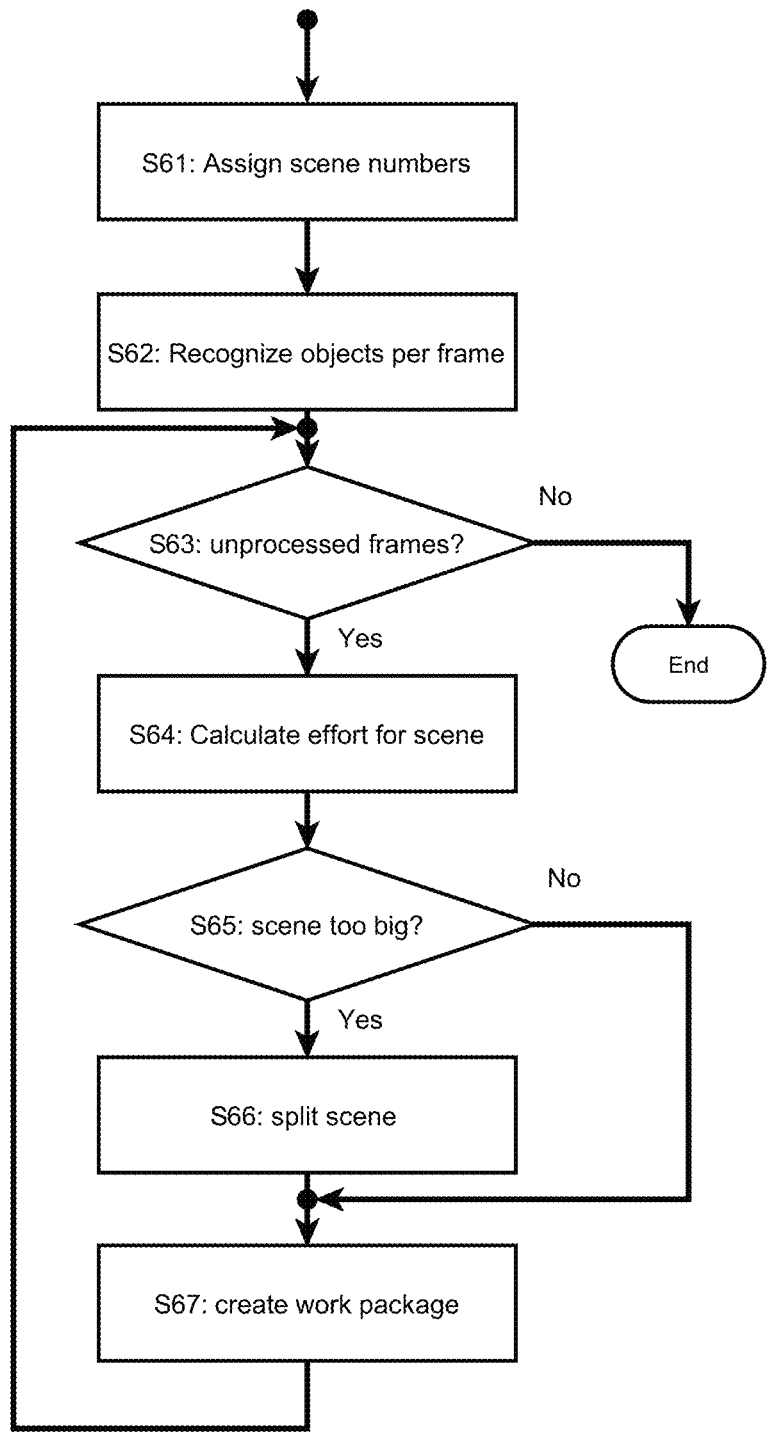
FIG. 6 is a flowchart of an embodiment of the invention.

FIG. 6 illustrates an embodiment of the inventive method as a program flowchart.

In step S61 (Assign scene numbers), the host computer divides the entire package of visual sensor data that is to be labeled in single images or frames. To each image, a scene number is assigned starting with an arbitrary value. Consecutive images are compared, and if their properties indicate a scene change, the scene number is augmented by one. A scene change can be indicated by analyzing the optical flow of the images.

Figure 7:
FIG. 7 is an exemplary image with optical flow indicated by dots.

FIG. 7 displays an exemplary image, in which the optical flow is indicated by dots. The image shows a train station scene with overhead contact wires. Optical flow is present e.g. at a lamp post or a post for the overhead contact wires. Moving through the scene, consecutive images would show a slight change in the optical flow. However, a scene change would result in considerable changes, as edges with considerable optical flow would be present in other parts of the image. Thus, by looking at a change in the optical flow, particular an integrated change over the area of the image, a scene change can be detected.

An exemplary method for detecting a scene change based on optical flow in the context of autonomous robots is described in N. Nourani-Vatani et al: "On the use of Optical Flow for Scene Change Detection and Description", 2013, J Intell Robot Syst.

If additional data is attached to the images, a scene change could also be determined based on the additional data. For instance, a change in GPS coordinates that is larger than the accuracy of the GPS measurement plus some expected absolute position change due to movement of the vehicle carrying the sensors indicates a scene change. This can easily be determined by calculating the difference of GPS coordinates associated with consecutive frames and comparing the absolute value to a predefined threshold.

In step S62 (Recognize objects per frame), one or more neural networks are used to recognize and classify the number of objects in each image. Further details have been described above in connection with FIG. 3.

In step S63 (unprocessed frames?), the host computer determines if there are unprocessed frames, i.e. images that have not been integrated into a work package yet. If no unprocessed frames remain (No), the method ends (End). If unprocessed frames remain, execution continues in step S64.

In step S64 (Calculate effort for scene), an accumulated effort is calculated for the current scene based on the quantity of objects present in each image that has been assigned that scene number. When calculating the effort, all objects could be weighted equally, or the weight for the effort could be chosen according to the class of the object. For instance, the effort for a pedestrian could be chosen higher than the effort for a car, as pedestrians can change their appearance and be present in all parts of the image, whereas cars will generally be confined to the road and their outer appearance changes only to a limited extent.

In step S65 (Scene too big?), the accumulated effort for the images in the scene is compared to a predefined package threshold. If the accumulated effort is higher than the package threshold (Yes), execution continues at step S66. Otherwise (No), all images of the scene can be compiled into a single work package, and execution continues at step S67.

In step S66 (split scene), the scene is split into different work packages at local minima of the number of objects per scene, as discussed above in connection with FIG. 4. When splitting the scene, a desired minimal batch size can be stipulated. Alternatively, the scene can split in a plurality of batches of images irrespective of size. These batches can later be combined as desired when creating work packages.

In step S67 (create work package), work packages are compiled, i.e. batches of images are bundled together for further processing by a labeler. Compiling work packages can comprise combining multiple batches of images, in order to ensure a uniform size of the work packages. This is especially useful in combination with a strategy of splitting scenes whenever a minimum number of objects per frame is reached. After creating all work packages corresponding to the scene, execution continues in step S63 to check whether unprocessed frames/scenes remain.

Figure 5:
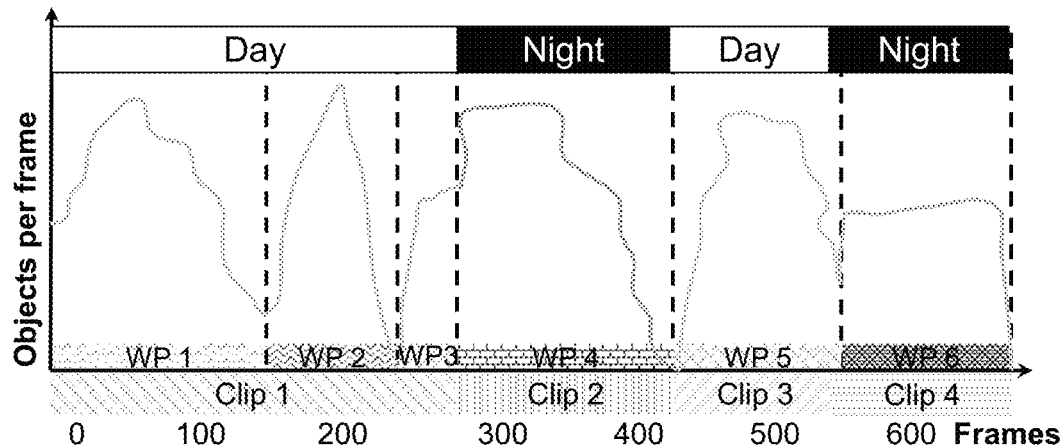
FIG. 5 is a schematic diagram of an exemplary package of video frames split according to the invention.

FIG. 5 is a schematic diagram of an exemplary package of video frames split according to the invention.

The original package comprised five video clips, Clip 1 to Clip 4, indicated as blocks on the bottom of the diagram. As can be seen in the diagram, the number of objects per frame varied during most of the clips, with a sudden change at clip boundaries. Longer clips have been split at local minima, resulting in six work packages WP 1 to WP 6, indicated as blocks with different patterns. The borders between work packages are indicated by vertical dashed lines.

Based on the information associated with the visual sensor data and/or determined in connection with counting the number of objects per frame, different alternative strategies for compiling work packages and/or assigning them to labelers could be pursued. For instance, similar work packages could be chosen based on the classes of objects shown in the images, the time of day or weather conditions when taking the images. Thus, similar situation could be labeled by the same worker, ensuring a more consistent treatment.

A labeler tasked with the annotation of night images could thus improve his skills on estimating object boundaries in lower contrast situations and thus allow for a consistent and efficient labeling of night images. Other strategies could comprise assign city scenes to labelers specializing in pedestrians, whereas highway scenes could be compiled to bigger work packages assigned to a specialized labeler for these more straightforward situations.

Those skilled in the art will appreciate that the order of at least some of the steps of exemplary embodiments of the inventive method may be changed without departing from the scope of the claimed invention. While the present invention has been described with respect to a limited number of embodiments, those skilled in the art will appreciate numerous modifications and variations therefrom. It is intended that the appended claims cover all such modifications and variations as fall within the spirit and scope of the present invention.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for automatically splitting visual sensor data comprising consecutive images, the method being executed by at least one processor of a host computer, the method comprising:

a) assigning a scene number to each image, wherein a scene comprises a plurality of images taken in a single environment, wherein assigning a scene number to each image is performed based on a comparison between consecutive images, the comparison being based on one or more of:
 optical flow;
 Global Positioning System (GPS) coordinates;
 Inertial Measurement Unit (IMU) acceleration data; or
 file properties;

b) determining an accumulated effort for the images in each scene, wherein the accumulated effort is determined based on the number of objects in the images of the scene, wherein the number of objects is determined using one or more neural networks for object detection; and c) creating packages of images, wherein the images with the same scene number are assigned to the same package unless the accumulated effort of the images in the package surpasses a package threshold.

2. The method of claim 1, wherein two consecutive images are assigned the same scene number based on one or more of the following conditions being met:

the absolute change in the optical flow is lower than a predefined change threshold;

the distance between GPS coordinates is lower than a predefined location threshold;

the difference between acceleration data is lower than a predefined movement threshold; or the two consecutive images are frames in the same video file or two image files whose file name starts with the same characters and/or whose timestamps do not differ by more than a maximum duration.

3. The method of claim 1, wherein only those objects are counted whose confidence level according to the neural network for object detection is higher than a certainty threshold.

4. The method of claim 1, wherein scenes are split based on the accumulated effort of the images in the scene surpassing the package threshold, and wherein the split is applied between consecutive images with a local minimum of objects.

5. The method of claim 1, wherein the creation of a package of images comprises adding images with a subsequent scene number to the package based on the accumulated effort for images already in the package being lower than the package threshold.

6. The method of claim 5, wherein the accumulated effort for images in the next scene is compared to the difference between the package threshold and the accumulated effort for images in the package, and wherein images in the next but one scene are added to the current package based on the difference being smaller than the accumulated effort for the next scene, and wherein a further package is created for the images in the next scene.

7. The method of claim 1, wherein the visual sensor data comprises not only consecutive image data from a first camera, but also consecutive data from a further visual sensor, wherein the image data from the first camera and the second visual sensor are temporally correlated, and wherein the consecutive data from the further visual sensor is split into packages based on the accumulated effort of the images from the first camera.

8. The method of claim 1, wherein objects of different categories are weighted differently when determining the accumulated effort, and wherein packages are split according to the weighted accumulated effort.

9. The method of claim 1, wherein the accumulated effort is modified based on one or more additional criteria.

10. The method of claim 1, further comprising:

assigning each package to a worker for labeling;

receiving labeled packages;

determining a quality norm for each label;

checking the correctness for each label that has a quality norm below a predefined quality threshold; and compiling the image data in one file.

11. A non-transitory computer-readable medium having processor-executable instructions stored thereon for automatically splitting visual sensor data comprising consecutive images, wherein the processor-executable instructions, when executed by at least one processor of a host computer, facilitate:

a) assigning a scene number to each image, wherein a scene comprises a plurality of images taken in a single environment, wherein assigning a scene number to each image is performed based on a comparison between consecutive images, the comparison being based on one or more of:

optical flow;

Global Positioning System (GPS) coordinates;

Inertial Measurement Unit (IMU) acceleration data; or file properties;

b) determining an accumulated effort for the images in each scene, wherein the accumulated effort is determined based on the number of objects in the images of the scene, wherein the number of objects is determined using one or more neural networks for object detection; and c) creating packages of images, wherein the images with the same scene number are assigned to the same package unless the accumulated effort of the images in the package surpasses a package threshold.

* * * * *